United States Patent
Reddy et al.

(10) Patent No.: US 11,234,017 B1
(45) Date of Patent: Jan. 25, 2022

(54) HIERARCHICAL MOTION SEARCH PROCESSING

(71) Applicant: Meta Platforms, Inc., Menlo Park, CA (US)

(72) Inventors: Harikrishna Madadi Reddy, San Jose, CA (US); Xianliang Zha, El Dorado Hills, CA (US); Junqiang Lan, Fremont, CA (US); Sujith Srinivasan, Cupertino, CA (US); Guogang Hua, San Diego, CA (US); Chung-Fu Lin, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/714,403

(22) Filed: Dec. 13, 2019

(51) Int. Cl.
*H04N 19/53* (2014.01)
*H04N 19/43* (2014.01)

(52) U.S. Cl.
CPC ............ *H04N 19/53* (2014.11); *H04N 19/43* (2014.11)

(58) Field of Classification Search
None
See application file for complete search history.

(56) References Cited

U.S. PATENT DOCUMENTS

| | | | | |
|---|---|---|---|---|
| 5,731,850 A * | 3/1998 | Maturi | .................. | H04N 5/145 348/699 |
| 7,536,487 B1 * | 5/2009 | Kohn | ..................... | H04N 19/61 345/503 |
| 2009/0003446 A1 * | 1/2009 | Wu | ...................... | H04N 19/587 375/240.16 |
| 2009/0010338 A1 * | 1/2009 | Wang | ................... | H04N 19/563 375/240.16 |
| 2009/0067505 A1 * | 3/2009 | Tourapis | .............. | H04N 19/573 375/240.16 |
| 2010/0020877 A1 * | 1/2010 | Au | ....................... | H04N 19/436 375/240.16 |
| 2010/0316123 A1 * | 12/2010 | Inokuma | ................ | H04N 19/43 375/240.12 |
| 2010/0329345 A1 * | 12/2010 | Andersson | ........... | H04N 19/567 375/240.16 |
| 2012/0147023 A1 * | 6/2012 | Cho | ....................... | G09G 5/393 345/557 |
| 2012/0177119 A1 * | 7/2012 | Dwarakapuram | ..... | H04N 19/43 375/240.16 |
| 2014/0254669 A1 * | 9/2014 | Rapaka | .................. | H04N 19/82 375/240.12 |
| 2017/0323454 A1 * | 11/2017 | Mehendale | ............. | G06T 7/238 |

(Continued)

*Primary Examiner* — Kate H Luo
(74) *Attorney, Agent, or Firm* — Van Pelt, Yi & James LLP

(57) ABSTRACT

A system comprises a source block buffer and a plurality of hardware motion estimation search processing units in communication with the source block buffer. The source block buffer is configured to store at least a portion of a source block of a source frame of a video. The plurality of hardware motion estimation search processing units are configured to perform at least a portion of a motion estimation for the source block at least in part in parallel across a plurality of different reference frames of the video. Each of the hardware motion estimation search processing units is configured to be assigned a different one of the plurality of different reference frames and is configured to compare at least the portion of the source block with a portion of the assigned one of the different reference frames.

20 Claims, 7 Drawing Sheets

(56) References Cited

U.S. PATENT DOCUMENTS

| | | | |
|---|---|---|---|
| 2017/0372494 A1* | 12/2017 | Zhu | H04N 19/587 |
| 2018/0115776 A1* | 4/2018 | Holcomb | H04N 19/186 |
| 2018/0124425 A1* | 5/2018 | Van Leuven | H04N 19/53 |
| 2021/0132688 A1* | 5/2021 | Kim | G06N 3/04 |

* cited by examiner

HIERARCHICAL MOTION SEARCH PROCESSING

BACKGROUND OF THE INVENTION

Video encoding involves expensive and resource intensive operations. In particular, one significantly challenging step in video encoding is motion estimation. Comparing source data to reference data to determine motion vectors can require considerable data bandwidth and processor computation, among other requirements. Moreover, as the video resolution increases, the amount of source and reference data significantly increases.

BRIEF DESCRIPTION OF THE DRAWINGS

Various embodiments of the invention are disclosed in the following detailed description and the accompanying drawings.

DETAILED DESCRIPTION

Figure 1:
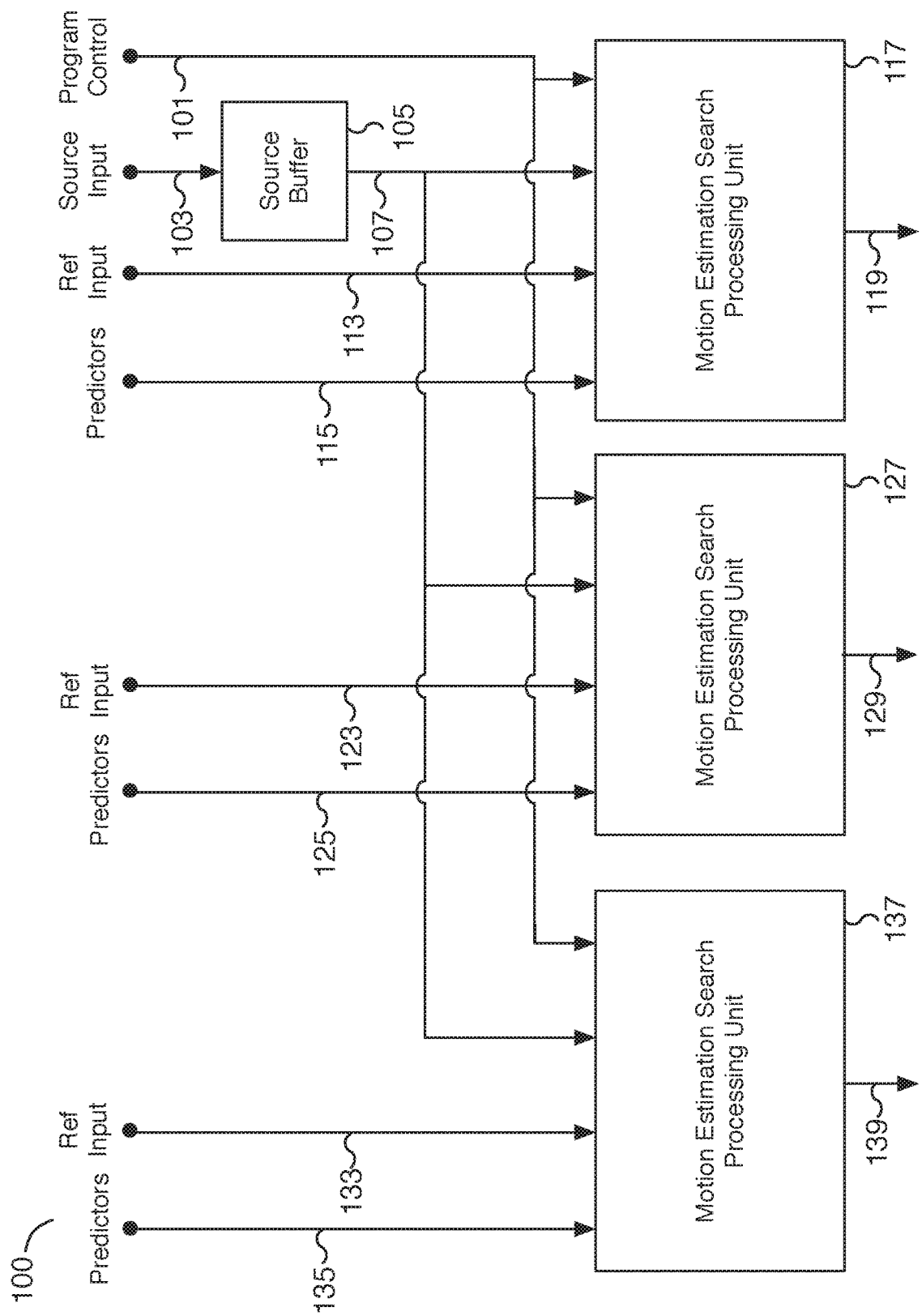
FIG. 1 is a block diagram illustrating an embodiment of a system for performing hierarchical motion search.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Typically, tradeoffs are made to achieve either performance or video quality requirements. These tradeoffs become even more difficult when the video needs to be encoded in close to real time. For a high quality video source, it is desirable to retain the high quality of the source video when encoding. Similarly, for a low quality video source, it is also desirable to encode with minimal loss in quality since any degradation on an already low quality source will be significant. One option is to focus on a single encoding format. But since there are often multiple competing encoding standards, a single encoding format has the disadvantage of limiting the encoded video's audience. Therefore, there is a need for a video encoding solution for motion estimation that achieves high quality video, is fast and computationally efficient, and is compatible with multiple encoding formats.

A hardware motion estimation search processing unit is disclosed. Using the described systems and techniques, hierarchical motion searches can be performed to convert video, including live video, in near real-time while retaining high quality in the converted video. In some embodiments, a hierarchical motion search processing system is configured with multiple hardware motion estimation search processing units to process multiple reference frames in parallel. For example, a hierarchical motion search processing system can be configured with two or more hardware motion estimation search processing units that each receive the same source block but different reference frames. The motion estimation search processing units each perform motion estimates on the reference frames in parallel. In some embodiments, each processing unit includes a reference frame line buffer for storing the loaded reference data of an assigned reference frame. The reference data is stored as groups of entire (or complete) rows of the reference frame. New rows of the reference frame are loaded into the reference frame line buffer as needed and replace rows that are no longer required. By utilizing a reference frame line buffer that is row-based, a motion search can be performed by loading the reference frame only once. Once the motion estimates are determined, corresponding motion vectors can be identified. In various embodiments, different video resolutions are utilized starting with lower resolutions and progressing to higher resolution versions of the video to successively refine the motion vectors. In some embodiments, the motion estimation search processing units are compatible and support a variety of video format/codecs. For example, each motion estimation search processing unit utilizes a unified search unit for performing motion estimations and supports a variety of source block sizes, reference frame search regions, and reference blocks.

In some embodiments, a system comprises a source block buffer and a plurality of hardware motion estimation search processing units in communication with the source block buffer. For example, the hardware motion estimation search processing units utilize the source block buffer to search for motion vectors. The motion vectors can reference movement between frames of a video. The source block buffer is configured to store at least a portion of a source block of a source frame of a video. For example, a portion of a source frame that is used to search for motion in reference frames is stored in the source block buffer. The buffer allows multiple hardware motion estimation search processing units to access the same portion of the source block to search multiple reference frames concurrently. For example, some embodiments include three hardware motion estimation search processing units that can perform three motion estimation searches concurrently to improve processing speeds. In the event more reference frames need to be searched, additional passes can be performed. For example, in the event six reference frames need to be searched for the same source block, a second pass through the three hardware motion estimation search processing units can be performed to search an additional three reference frames. Additional sequential passes can be performed for additional reference frames.

In some embodiments, the plurality of hardware motion estimation search processing units are configured to perform at least a portion of a motion estimation for the source block at least in part in parallel across a plurality of different reference frames of the video. Each processing unit of the hardware motion estimation search processing units is configured to be assigned a different one of the plurality of different reference frames. For example, each processing unit performs a search on a different reference frame of the same video utilizing the source block from the source block buffer. In some embodiments, each processing unit is configured to compare at least the portion of the source block with a portion of the assigned one of the different reference frames. For example, to perform a motion estimation, each processing unit compares a portion of the source block with one or more portions of its assigned reference frame(s). From the motion estimation, the best candidate motion vectors are determined and saved. The motion vectors can be used as predictors when performing motion search using a different source block, for example, a source block from a higher resolution source frame. In some embodiments, the motion vector is a final candidate used for video compression.

In some embodiments, each processing unit of the hardware motion estimation search processing units includes a reference frame buffer. The reference frame buffer is configured to store at least some of the portion of the assigned one of the different reference frames being compared. In some embodiments, the stored portion corresponds to entire (or complete) rows of pixels of the reference frame. The reference frame may be from a subsample version of an original video. For example, the reference frame may be a version of the original frame down-sampled by 16, 4, or another factor. A search region of the reference frame is searched using a portion of the reference data stored in the reference frame buffer. For example, a search region is prepared from the reference frame buffer and searched using a source block. When an entire row is no longer needed, for example, the top row of the reference frame buffer is no longer needed, a new row of reference data is loaded from the reference frame. In various embodiments, new rows of reference data are loaded into the reference frame buffer and replace rows that are no longer needed. By storing rows of the reference frame in their entirety and replacing no longer needed rows with new rows, a reference frame need only be loaded into the reference frame buffer once to complete a motion search on the reference frame. This approach significantly improves bandwidth utilization and efficiency by reducing the number of memory reads. In various embodiments, each reference frame need only be loaded once for any particular source block.

FIG. 1 is a block diagram illustrating an embodiment of a system for performing hierarchical motion search. In the example shown, system 100 is a hierarchical motion search processing system for performing high quality motion searches. System 100 includes source buffer 105 and three motion estimation search processing units 117, 127, and 137. System 100 includes multiple inputs including program control 101, source input 103, three reference inputs 113, 123, and 133, and three motion predictors 115, 125, and 135. Each of motion estimation search processing units 117, 127, and 137 receives program control 101 and source block input 107 along with their own respective reference input and predictors. Motion estimation search processing unit 117 receives reference input 113 and predictors 115, motion estimation search processing unit 127 receives reference input 123 and predictors 125, and motion estimation search processing unit 137 receives reference input 133 and predictors 135. Motion estimation search processing units 117, 127, and 137 output motion estimate search results 119, 129, and 139, respectively. In various embodiments, system 100 performs motion searches on three different reference frames using a source block of a source frame stored in source buffer 105. The motion estimate search results 119, 129, and 139 can be motion vectors used for video encoding and/or video compression. In some embodiments, system 100 is part of a larger hierarchical motion search processing system and includes additional components not shown. For example, in some embodiments, system 100 includes memory (not shown) from which source frames and reference frames are retrieved from. Although three motion estimation search processing units 117, 127, and 137 are shown in system 100, system 100 may be configured with additional motion estimation search processing units as appropriate.

In some embodiments, input program control 101 is a program control signal used to control the operation of motion estimation search processing units 117, 127, and 137. Program control 101 may be used to determine a variety of operating parameters for motion search. In some embodiments, program control 101 determines the motion vector parameters such as the size of the search window and the partition size(s) to calculate, the search region, the number of motion vector candidates to propagate, whether to utilize motion predictions, the number of sequential passes each motion estimation search processing unit should perform, etc.

In some embodiments, input source input 103 is used to receive a source block for storing in source buffer 105. The source block may be retrieved from a memory storage location or another appropriate location (not shown). In various embodiments, the source block stored in source buffer 105 corresponds to a portion of a source frame of a video. For example, in some embodiments, the source block is a 16×16 pixel source block or another appropriately sized source block. The video may be a subsampled version of the video for performing hierarchical motion search. In various embodiments, the source block stored in source buffer 105 is transmitted to motion estimation search processing units 117, 127, and 137 via source block input 107. As shown in the example, each one of motion estimation search processing units 117, 127, and 137 receive the same source data via source block input 107.

In some embodiments, reference inputs 113, 123, and 133 each provide reference frame data to one of motion estimation search processing units 117, 127, and 137, respectively. The reference frame data may be retrieved from a memory storage location or another appropriate location (not shown). In various embodiments, each motion estimation search processing unit receives a different reference frame allowing the processing units to each perform a motion search on a different reference frame concurrently. Along with reference frames, motion estimation search processing units 117, 127, and 137 can each receive input motion predictors 115, 125, and 135, respectively. In various embodiments, input motion predictors 115, 125, and 135 provide optional predictors that can be used as starting candidate(s) for a motion search.

In some embodiments, motion estimation search processing units 117, 127, and 137 are each configured to perform a motion search on reference data, such as a reference frame, received via reference inputs 113, 123, and 133, respectively, using a source block received via source block input 107. In some configurations, motions predictors via motion predictors 115, 125, and 135, respectively, are used to help perform the motion searches. The results of motion searches on the corresponding reference data are motion estimate search results 119, 129, and 139. In some embodiments, motion estimate search results 119, 129, and 139 are motion vectors or another appropriate motion result. For example, the motion estimate search results may include a motion estimate corresponding to the amount of measured motion between a source block and a reference frame block. In some embodiments, the motion estimate search results include sum of absolute differences measurements or another motion estimate measurement. Motion estimate search results 119, 129, and 139 may correspond to the best candidates from searching the corresponding reference data. In some embodiments, motion estimate search results 119, 129, and 139 include search results for more that one search partition configuration. For example, search results can cover a 4×4, 4×8, 8×4, 8×8, 8×16, 16×8, 16×16, or another appropriately sized search region. In some embodiments, motion estimation search processing units 117, 127, and 137 each compute motion estimates for a sub-block of the source block and then aggregate sub-block results to determine corresponding results for one or more larger partition configurations made up of multiple sub-blocks.

In various embodiments, motion estimation search processing units 117, 127, and 137 are each configured to load the reference data in complete row units. As searches on search regions are completed and rows are no longer needed, new rows are loaded from reference inputs 113, 123, and 133, respectively, to replace the rows no longer needed. In some embodiments, the rows are loaded from top to bottom of a reference frame. In some embodiments, each reference frame is only loaded at most once for a corresponding motion search.

Figure 2:
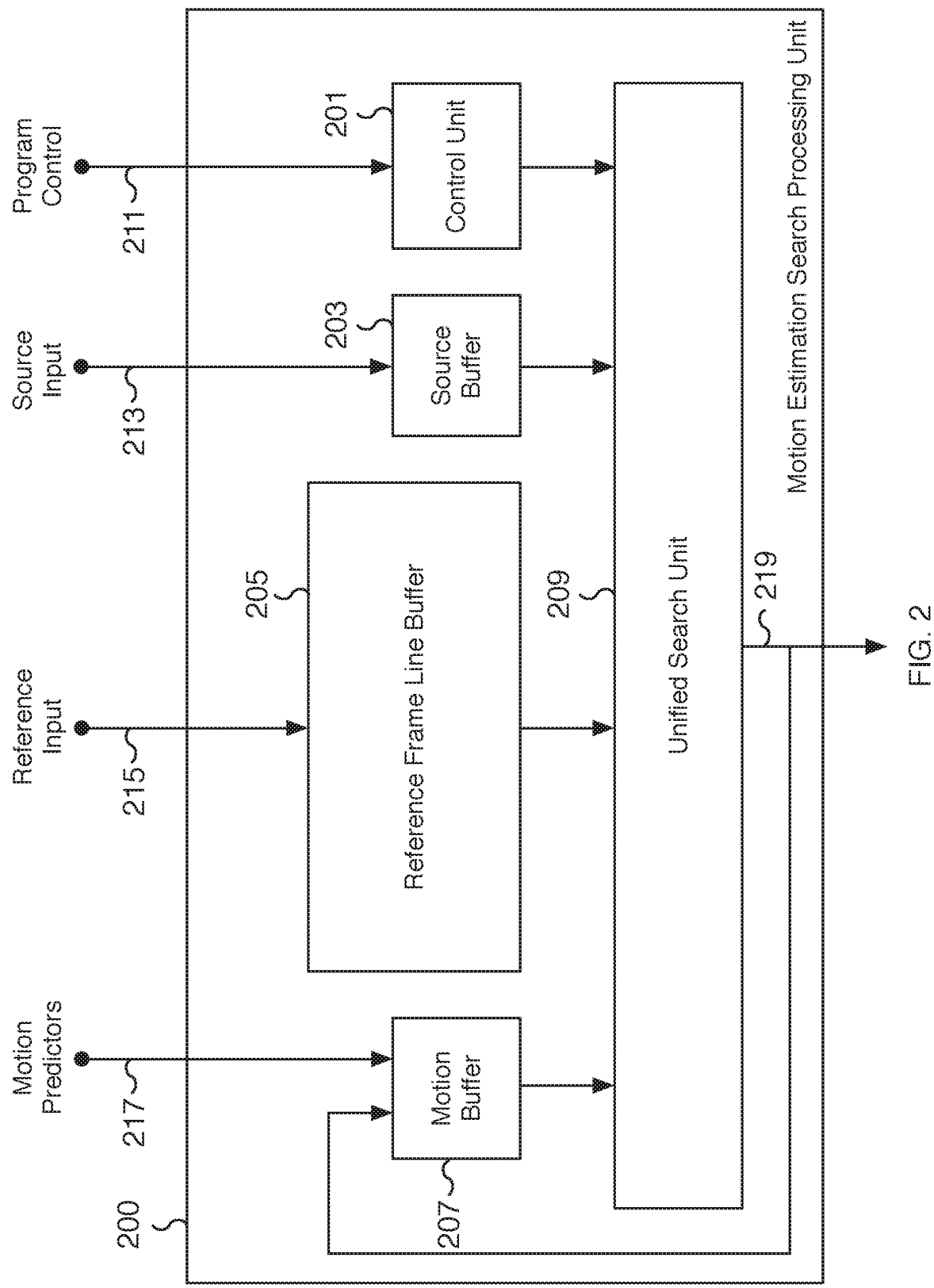
FIG. 2 is a block diagram illustrating an embodiment of a motion estimation search processing unit for performing hierarchical motion search.

FIG. 2 is a block diagram illustrating an embodiment of a motion estimation search processing unit for performing hierarchical motion search. In the example shown, motion estimation search processing unit 200 is a motion estimation search processing unit that can be utilized for hierarchical motion search. Motion estimation search processing unit 200 includes control unit 201, source buffer 203, reference frame line buffer 205, motion buffer 207, and unified search unit 209. Motion estimation search processing unit 200 receives input program control 211, source input 213, reference input 215, motion predictors 217, and output motion estimate search results 219. In some embodiments, motion estimation search processing unit 200 is motion estimation search processing units 117, 127, and/or 137 of FIG. 1. By configuring a system with multiple motion estimation search processing units, such as motion estimation search processing unit 200, multiple reference frames can be searched concurrently using the same source block.

In some embodiments, input program control 211 is a program control signal used in connection with control unit 201 to control the operation of motion estimation search processing unit 200. In some embodiments, program control 211 is connected to program control 101 of FIG. 1. Program control 211 may be used to direct and provide instructions to control unit 201 for controlling and performing a motion search operation. The control functionality may include controlling a variety of operating parameters for motion search. In some embodiments, program control 211 and control unit 201 control the motion vector parameters such as the size of the search window and the partition size(s) to calculate, the search region, the number of motion vector candidates to propagate, whether to utilize motion predictions, the number of motion searches to perform, access to reference frame line buffer 205, utilization of motion estimates from motion buffer 207, etc.

In some embodiments, input source input 213 is used to receive a source block for storing in source buffer 203. In some embodiments, source input 213 is connected to source block input 107 of FIG. 1. Source buffer 203 stores a source block that is used in a motion search. In various embodiments, the source block stored in source buffer 203 corresponds to a portion of a source frame of a video. For example, in some embodiments, the source block is a 16×16 pixel source block or another appropriately sized source block. The video may be a sub sampled version of the video for performing hierarchical motion search. The source block stored in source buffer 203 is transmitted to unified search unit 209 for performing motion searches on reference data.

In some embodiments, reference input 215 provides reference frame data to motion estimation search processing unit 200 where it is stored in reference frame line buffer 205. In some embodiments, reference input 215 is connected to one of reference inputs 113, 123, or 133 of FIG. 1. In various embodiments, the received reference frame data corresponds to at least a portion of a reference frame of a video assigned to motion estimation search processing unit 200 and is used to perform a motion search. Reference frame line buffer 205 stores the received reference data, which is provided as appropriate to unified search unit 209. For example, reference data corresponding to a search region is provided to unified search unit 209 from reference frame line buffer 205. In various embodiments, the reference data corresponding to a reference frame is received from reference input 215 as entire rows of the reference frame. As rows are no longer needed, a new row is received from reference input 215 and stored in reference frame line buffer 205. In some embodiments, the rows of the reference frame are received at reference frame line buffer 205 starting with the top row and finishing with the bottom row of the reference frame. In some embodiments, the search regions provided from reference frame line buffer 205 to unified search unit 209 traverse the reference data in reference frame line buffer 205 from left to right of the reference frame.

In some embodiments, motion estimation search processing unit 200 can receive motion estimate candidates from input motion predictors 217. In some embodiments, input motion predictors 217 is connected to one of motion predictors 115, 125, or 135 of FIG. 1. In various embodiments, input motion predictors 217 provides optional predictors that can be used as starting candidate(s) for a motion search. Motion buffer 207 stores both received motion predictors (as motion estimate candidates) from input motion predictors 217 and motion search results (as motion estimate candidates) from output motion estimate search results 219. In some embodiments, motion buffer 207 also stores one or more zero motion vectors. In various embodiments, motion buffer 207 internally includes a multiplexer (not shown) and is configured to send motion predictors from input motion predictors 217, output motion estimate search results 219, and/or zero motion vectors to unified search unit 209. In various embodiments, motion buffer 207 stores the best candidates based on motion estimate results for a further higher resolution search. For example, the best motion estimate candidates may be initialized with input motion predictors 217. As motion search results are performed, the initial candidates may be replaced with better candidates from output motion estimate search results 219. The candidates may be intermediate motion search results that are refined as the search progresses. In some embodiments, the candidates are motion search results from a previous search pass. For example, the candidates are results from a lower resolution search using a version of the source video down-sampled by a larger factor, such as by a factor of 16. In various embodiments, motion estimate candidates correspond to areas in the reference data that best match a source block. In some embodiments, the motion estimate candidates may be represented as a vector such as a motion vector.

In some embodiments, unified search unit 209 receives operating control signals from control unit 201, a source block from source buffer 203, a search region of a reference frame from reference frame line buffer 205, and optional motion estimate candidates from motion buffer 207. Unified search unit 209 performs a motion search on the search region using the source block. In some embodiments, the search may be initiated with the best motion estimate candidates. For example, the motion estimate candidates provided from motion buffer 207 may be used to improve search performance by providing an optimized starting location. In some embodiments, the motion estimate candidates provided from motion buffer 207 are used to propagate the best motion estimate results after completing searches on different resolutions of the source video. For example, search results performed on a version of the video down-sampled by a factor of 16 are used to help refine the search performed on a version of the video down-sampled by a factor of 4. In various embodiments, the search region provided from reference frame line buffer 205 traverses the reference data stored in reference frame line buffer 205 from left to right and top to bottom. For example, for a particular source block, multiple search regions are provided via reference frame line buffer 205. For each particular source block, a motion search is performed on multiple search regions of a reference frame to determine the best matches of the source block in the reference frame. After each search region is searched, motion estimate search results are outputted via output motion estimate search results 219. The results may be stored in motion buffer 207 as additional higher resolution references are searched. Once all entire search areas are complete, for example, all candidates are searched using a source block, the motion estimate search results are outputted from motion estimation search processing unit 200 via output motion estimate search results 219. In some embodiments, output motion estimate search results 219 is connected to one of output motion estimate search results 119, 129, or 139 of FIG. 1.

In some embodiments, unified search unit 209 is configured to perform a motion search on reference data, such as a reference frame, using search regions received from reference frame line buffer 205 and a source block received via source buffer 203. Once a search on a search region is completed, a new search region may be provided to unified search unit 209. In some embodiments, the new search region traverses the reference data in reference frame line buffer 205 from left to right and top to bottom until the entire row of a reference frame is no longer needed and can be replaced in reference frame line buffer 205 with a new row of reference data of the reference frame.

In some embodiments, motion estimate search results from unified search unit 209 include search results for more that one search partition configuration. For example, search results can cover a 4×4, 4×8, 8×4, 8×8, 8×16, 16×8, 16×16, or another appropriately sized search region. In some embodiments, unified search unit 209 computes motion estimates for a sub-block of the source block and then aggregates sub-block results to determine corresponding results for one or more larger partition configurations made up of multiple sub-blocks. For example, results for 4×8 and 8×4 partitions are computed by summing two appropriate 4×4 sub-block partitions. Results for 8×8 partitions are computed by summing four appropriate 4×4 sub-block partitions. Results for 8×16 and 16×8 partitions are computed by summing eight appropriate 4×4 sub-block partitions. Results for 16×16 partitions are computed by summing 16 appropriate 4×4 sub-block partitions.

Figure 3:
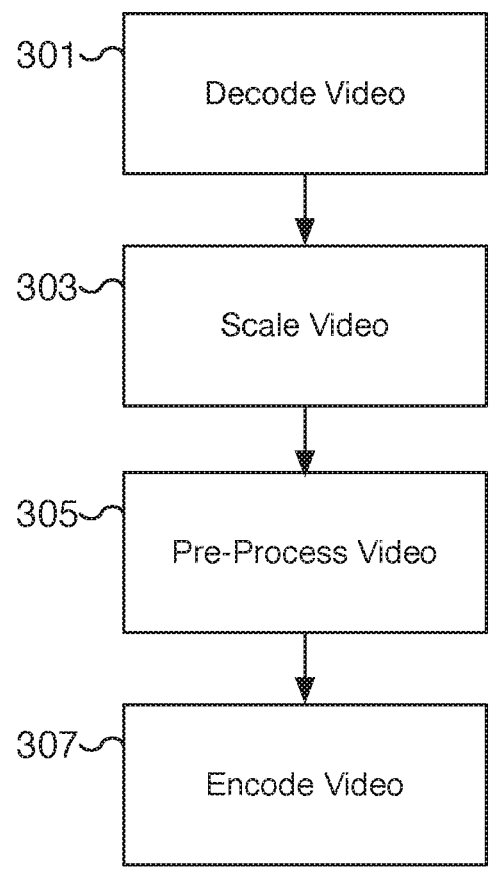
FIG. 3 is a flow chart illustrating an embodiment of a process for performing video conversion.

FIG. 3 is a flow chart illustrating an embodiment of a process for performing video conversion. In some embodiments, system 100 of FIG. 1 and/or one or more instances of motion estimation search processing unit 200 of FIG. 2 are used for performing portions of a video conversion process and in particular for performing hierarchical motion search operations as part of encoding the video into one or more different video formats. The process of FIG. 3 can be used to convert a video into one or more new encoding formats while compressing the video and also retaining a high video quality standard. The incoming video can be live video and the conversion can be performed in near real-time. In some embodiments, multiple encoding formats are supported and outputted in part to support a large number of supported devices and corresponding viewers. In some embodiments, the video encoding is a form of video compression.

At 301, a source video is decoded. For example, a source video is decoded from the source video format. The video format may be inspected to confirm that a video standard is met. In some embodiments, the source video is converted to uncompressed video. The source video may be a video file or live video, such as live streaming video. Depending on the source video, the quality of the video can range from very high to very low quality. The source video may also utilize different resolutions, bitrates, codecs, etc. and is decoded in anticipation of encoding to a new format. In some embodiments, the video is captured from mobile devices such as mobile phones with limited processing and power budgets. The video may be received as part of sharing the video with a larger audience on a video sharing platform. In some embodiments, the video sharing platform is a social networking platform.

At 303, the source video is scaled. For example, in some embodiments, a scaler unit converts the decoded source video to one or more different resolutions. In various embodiments, the source video is down-sampled to a lower resolution version. For example, the source video can be down-sampled by a factor of 16 and 4 to produce down-sampled versions for performing hierarchical motion searches. In some embodiments, each down-sampled version is a high quality version and retains a high standard of image quality despite the lower resolution. For example, each pixel in the down-sampled version is created by at least evaluating a group of neighboring pixels from a higher resolution video. Alternatively, in some embodiments, the down-sampled version is created by dropping pixels rather than evaluating a plurality of neighboring pixels. By dropping pixels, the down-sampled version is a down-sampled version with low image quality.

At 305, the video data is pre-processed. In some embodiments, the video may be enhanced by pre-processing the video prior to the video encoding step performed at 307. For example, one or more different image/video filters may be applied to the video for improving encoding performance and/or quality. In some embodiments, artifacts and/or other image irregularities may be removed to improve video quality. In some embodiments, statistics of the video may be extracted during the pre-processing step that can be used as input for later stages.

At 307, the video is encoded into one or more different formats. For example, the decoded video is encoded using one or more different video codecs. The encoded formats may include target parameters such as video resolution, bitrate, quality, etc. and may include compressing the video to remove redundancy such as spatial and temporal redundancy. As one part of the video encoding step, motion vectors are determined by a motion estimation search. For example, reference frames of the video are searched using portions of source frames to identify temporal redundancy. Depending on encoding parameters, past and/or future frames can be utilized as reference frames. In some embodiments, the motion vectors found as part of a motion estimation search utilize system 100 of FIG. 1. Using system 100 of FIG. 1, a high quality hierarchical motion search using one or more different resolutions of the video is performed. The search results from the hierarchical motion search may be used in subsequent searches, such as integer and sub-pixel searches, to fine tune motion search results. Although the motion search step is just one portion of the video encoding process, it has significant computational and resource requirements.

Figure 4:
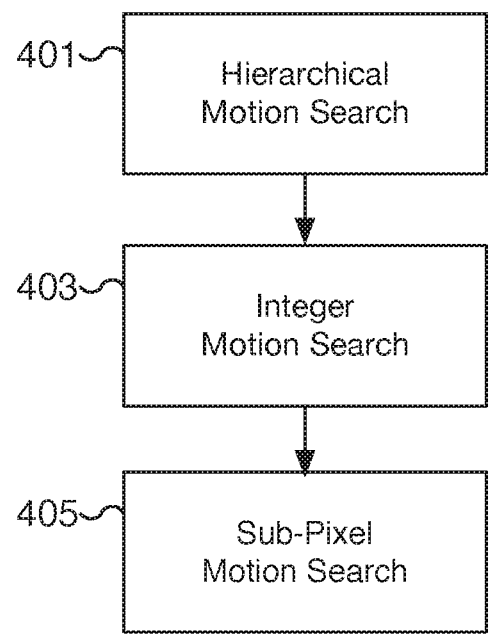
FIG. 4 is a flow chart illustrating an embodiment of a process for performing a motion estimation search.

FIG. 4 is a flow chart illustrating an embodiment of a process for performing a motion estimation search. The process of FIG. 4 may be performed as part of a video encoding step for converting video to an encoding format. In some embodiments, the motion estimation search includes multiple refinement steps starting with a hierarchical motion estimation search. The results from the hierarchical motion estimation search may be used to perform an integer pixel search and then a sub-pixel search. In some embodiments, additional (or fewer) motion search steps may be performed, as appropriate. By utilizing multiple steps, however, the total computational requirements are reduced and the performance is significantly increased. In particular, in some embodiments, system 100 of FIG. 1 and/or one or more instances of motion estimation search processing unit 200 of FIG. 2 are used for performing hierarchical motion search operations. In some embodiments, the use of system 100 of FIG. 1 and/or motion estimation search processing unit 200 of FIG. 2 allows multiple different encoding formats to be supported by the same hardware unit. In some embodiments, the process of FIG. 4 is performed at 307 of FIG. 3.

At 401, a hierarchical motion search is performed. In various embodiments, using one or more different resolution versions of the source video, a hierarchical motion search is performed. In some embodiments, high quality down-sampled versions are utilized for the hierarchical motion search. For example, a down-sampled or down-scaled version of the video from step 303 of FIG. 3 is utilized as input to a hierarchical motion search. The high quality down-sampled video retains high image quality despite being a lower resolution. In performing step 401, a low resolution version of the video is searched to identify motion estimate candidates. Next a higher resolution version is searched using the motion estimate candidates from the previous search performed on the lower resolution version of the video. Successive searches can be performed using higher resolution versions with results from the previous search to help refine the motion search results. For example, an initial search can be performed on the source video down-sampled along each dimension by $\frac{1}{16}$. A subsequent search can be performed on the source video down-sampled along each dimension by $\frac{1}{4}$ using motion predictors from the $\frac{1}{16}$ search. In some embodiments, a full resolution search is performed as the final step for the hierarchical motion search. By starting with lower resolution initial searches, data bandwidth, processor, and other resources are reduced with minimal impact on search results.

At 403, an integer motion search is performed. Using the motion estimation search results from 401, an integer pixel motion search is performed to refine the motion search results. For example, multiple reference frames can be searched using integer pixel resolution to refine motion search results. The results of integer refinement can be utilized for a sub-pixel motion search.

At 405, a sub-pixel motion search is performed. Using the integer motion estimation search results from 403, one or more sub-pixel motion searches are performed to further refine the motion search results. For example, multiple reference frames can be searched using $\frac{1}{2}$, $\frac{1}{4}$, $\frac{1}{8}$, or another sub-pixel resolution to refine motion search results. The results of sub-pixel refinement can be utilized for subsequent steps of video encoding.

Figure 5:
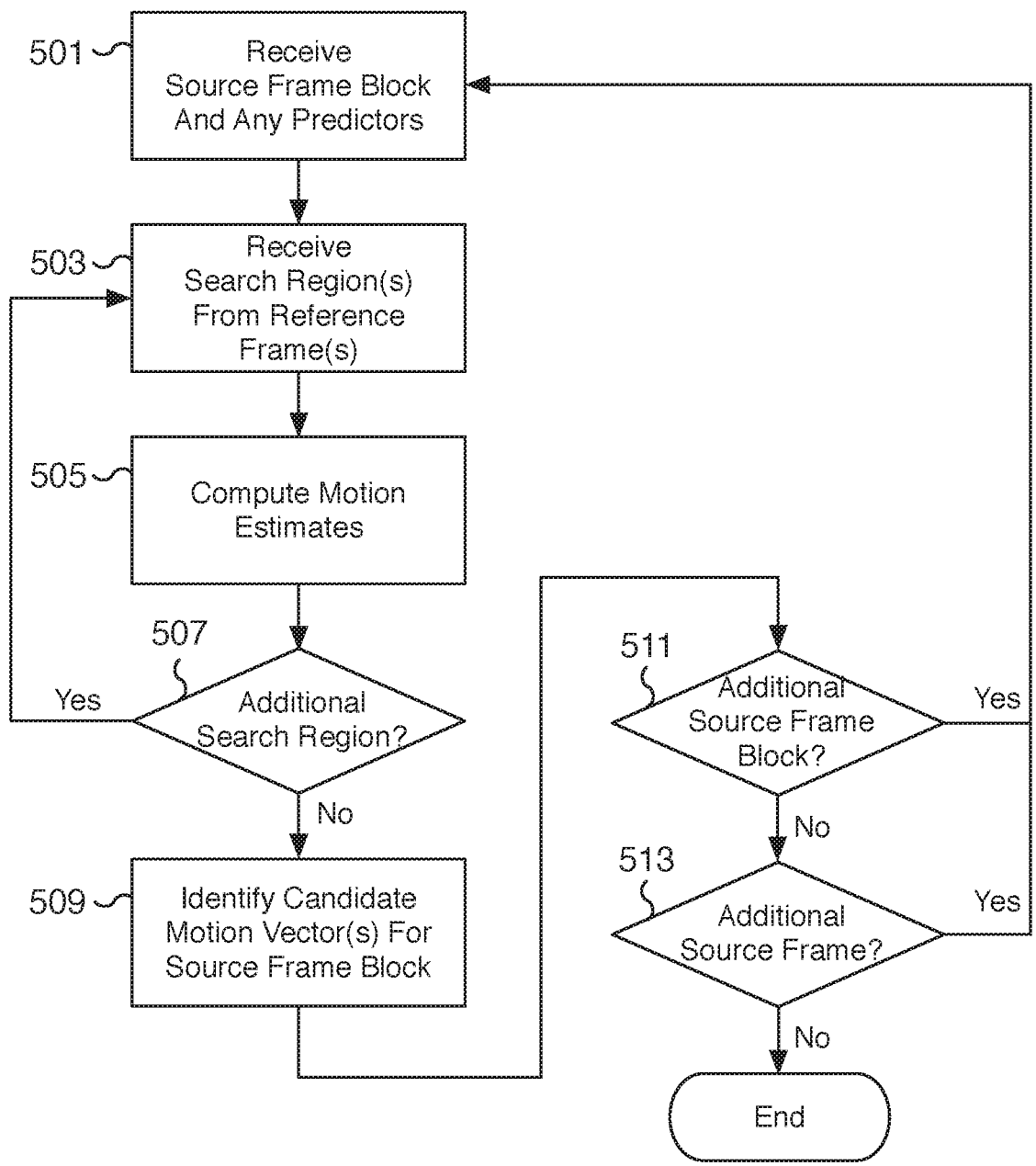
FIG. 5 is a flow chart illustrating an embodiment of a process for performing hierarchical motion search.

FIG. 5 is a flow chart illustrating an embodiment of a process for performing hierarchical motion search. The process of FIG. 5 is performed in part to identify the best motion estimation results and corresponding motion vectors for a source frame block by searching multiple reference frames. A source frame is selected and a portion of the source frame, a source block, is used for the motion search against reference frames. For each source block, one or more search regions of the reference frame are searched. The motion vectors corresponding to the motion estimates that most closely match the source block are selected as the best candidate motion vectors. In some embodiments, multiple reference frames are searched concurrently using the same source block. Using the process of FIG. 5, multiple source blocks for a source frame can be searched and multiple source frames of the video can be searched. In some embodiments, the process of FIG. 5 is performed at 401 of FIG. 4. In some embodiments, the process of FIG. 5 is performed by system 100 of FIG. 1 and/or concurrently by multiple instances of motion estimation search processing unit 200 of FIG. 2.

At 501, a source frame block and any motion predictors are received. For example, a source frame block is a source block of a source frame of the video to be encoded. The source frame block can correspond to a portion of the source frame, such as a 16×16 pixel block. In some embodiments, the source block is received from a source buffer such as source buffer 105 of FIG. 1 and/or source buffer 203 of FIG. 2. In various embodiments, different sized source frame blocks may be appropriate and may be dependent on the target encoding format. Along with the source frame block, optional motion predictors may be received. For example, motion predictors can be used to initiate the motion search with a starting location. In some embodiments, the motion predictors are motion vectors or a location corresponding to the reference frame. Motion predictors may be the result of a previous motion search, if available, such as a search using a lower resolution source frame block and reference frame or search region of the reference frame. Motion predictors may be zero motion vectors. In some embodiments, the source block can be configurable. For example, the size of the source block can be configured to be optimized for the source and target formats. In some embodiments, the source frame block and any motion predictors are received at a unified search unit such as unified search unit 209 of FIG. 2. In some embodiments, any motion predictors may be stored in a motion buffer such as motion buffer 207 of FIG. 2 prior to being received at a unified search unit.

At 503, for each reference frame, a search region is received. For example, at steps 503, 505, and 507, multiple search regions corresponding to multiple reference frames can be processed concurrently. In some embodiments, each reference frame is assigned to and searched by a motion estimation search processing unit. At 503, each motion estimation search processing unit receives a search region corresponding to a reference frame. In some embodiments, the reference frame is stored in a reference frame line buffer such as reference frame line buffer 205 and the search region is received at a unified search unit such as unified search unit 209 of FIG. 2.

In some embodiments, each pass through steps 503, 505, and 507 is used to search a reference frame. In the event there are multiple motion estimation search processing units, multiple reference frames can be searched concurrently. For example, system 100 of FIG. 1 includes three motion estimation search processing units 117, 127, and 137 each configured to perform steps 503, 505, and 507 concurrently and is configured to search three reference frames concurrently. Although not explicitly shown in FIG. 5, in some embodiments, multiple sequential passes through steps 503, 505, and 507 may also be performed to search additional reference frames above the number of available motion estimation search processing units. Using system 100 of FIG. 1 as an example, each additional pass through steps 503, 505, and 507 can search an additional three reference frames.

At 505, motion estimates are computed. For example, each motion estimation search processing unit computes one or more motion estimates for a search region of a reference frame using a source frame block. A motion estimate evaluates the difference between a searched portion of the search region with the source frame block. In some embodiments, a sum of absolute differences operation is performed between a searched portion of the search region with the source frame block. For example, each pixel of the source frame block is compared with a corresponding pixel of the searched portion of the search region. In some embodiments, the search region is larger than the source block and multiple reference blocks or portions of the search region are evaluated for motion estimates. In various embodiments, each search region is evaluated by a unified search unit of a motion estimation search processing unit and multiple search regions of different reference frames are searched in parallel. In some embodiments, at 505, all portions of the search region of the reference frame are searched and evaluated for motion estimates. In various embodiments, motion estimates are computed for a search region using a source block by a motion estimate search processing unit such as motion estimation search processing unit 200 of FIG. 2.

At 507, a determination is made whether an additional search region exists. In the event an additional search region exists, processing loops back to 503 to receive a new search region. In some embodiments, the new search region may overlap with the previous region but will include new frame data. In the event no additional search region exists, processing proceeds to 509.

At 509, candidate motion vectors for a source frame block are identified. For example, the best candidate motion vectors are identified by comparing the motion estimates computed at 505. In some embodiments, one or more best candidate motion vectors are identified. The motion vectors correspond to the locations in portions of the corresponding reference frames that are most similar to the source frame. In various embodiments, these locations are the best candidates for compression by removing temporal redundancy. In some embodiments, the candidate motion vectors will be motion predictors used to initiate motion searches on additional passes of the source frame with reference frames. For example, higher resolution versions of the source and reference frames may start their searches using the candidate motion vector results. In some embodiments, the candidate motion vectors are outputted as motion estimate search results 119, 129, and/or 139 of FIG. 1 and/or motion estimate search results 219 of FIG. 2.

At 511, a determination is made whether an additional source frame block exists. In the event an additional source frame block exists, processing loops back to 501 to process an additional source frame block. In the event no additional source frame block exists, processing proceeds to 513.

At 513, a determination is made whether an additional source frame exists. In the event an additional source frame exists, processing loops back to 501 to process a new source frame block from a new source frame. In the event no additional source frame block exists, processing completes.

Figure 6:
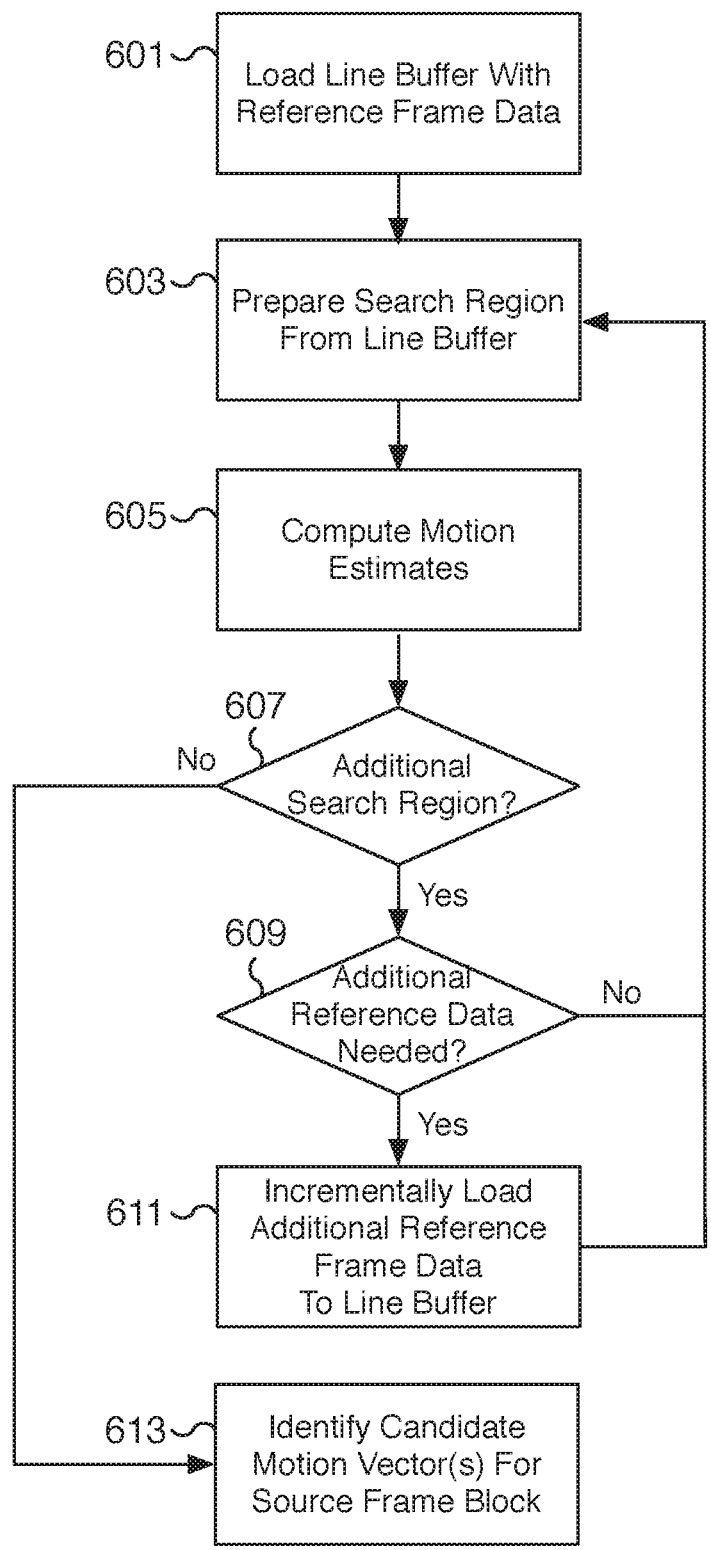
FIG. 6 is a flow chart illustrating an embodiment of a process for performing hierarchical motion search using a reference frame line buffer.

FIG. 6 is a flow chart illustrating an embodiment of a process for performing hierarchical motion search using a reference frame line buffer. The process of FIG. 6 is performed in part to identify the best motion estimation results and corresponding motion vectors for a source frame block by searching a reference frame. The searched reference frame is loaded into a reference frame line buffer of a motion estimation search processing unit and compared with a provided source frame block. By utilizing the reference frame line buffer, each reference frame is loaded from memory only once for a source block motion search. In some embodiments, the process of FIG. 6 is performed at steps 501, 503, 505, 507, and/or 509 of FIG. 5. In some embodiments, the process of FIG. 6 is performed by system 100 of FIG. 1 and/or concurrently by multiple instances of motion estimation search processing unit 200 of FIG. 2. In some embodiments, the reference frame line buffer utilized by the process of FIG. 6 is reference frame line buffer 205 of FIG. 2.

At 601, a reference frame line buffer is loaded with reference frame data. For example, data corresponding to a reference frame is loaded into the line buffer. In some embodiments, the data is only a subset of the reference frame and additional data from the reference frame is loaded as appropriate. In various embodiments, the line buffer supports (and requires) loading each row of the reference frame in its entirety. For example, reference data is not loaded as partial rows but only as entire (or complete) rows. The rows may be loaded from the top to the bottom of the reference frame allowing the motion search to proceed from top to bottom. In various embodiments, the reference frame line buffer may be configurable for different row lengths. For example, a video and corresponding frames down-sampled by a factor of 16 require a different row length than a video and corresponding frames down-sampled by a factor of 4. In various embodiments, the different levels of the hierarchical search (using different resolutions of the source video) require different row lengths for the expected frames and the reference frame line buffer can be configured, for example, to adjust the row length based on the expected frame size.

At 603, a search region of the reference frame is prepared from the reference frame line buffer. For example, a portion of the reference data stored in the reference frame line buffer is prepared as a search region. In some embodiments, the search region is a subset of the reference frame and different search regions may overlap as the motion search progresses through the reference frame. In some embodiments, the search region advances from left to right of the reference frame along the entire row of the reference frame. In some embodiments, the size of the search region can be configurable.

In some embodiments, one or more local memory buffers may be utilized for aligning and preparing search regions. For example, a local line buffer may be used to prepare search regions by extracting the appropriate rows or subsets of appropriate rows from the reference frame line buffer. The local line buffer may be utilized to optimize memory operations for the motion search. For example, the local line buffer may be used to increase performance for different sized frames by minimizing the amount of data shuffling required in the reference frame line buffer. In some embodiments, a subset of the data in the reference frame line buffer is replicated in the local line buffer.

At 605, motion estimates are computed. For example, using the search region prepared at 603, motion estimates are computed by comparing the search region to a source block. In various embodiments, the motion estimates are determined using the sum of absolute differences or another appropriate measure. In some embodiments, the step of 605 is performed at and as described with respect to 505 of FIG. 5.

At 607, a determination is made whether an additional search region exists. In the event an additional search region exists, processing proceeds to 609 to determine whether additional reference frame data is needed for the additional search region. In the event no additional search region exists, processing proceeds to 613.

At 609, a determination is made whether additional reference frame data is needed. In the event additional reference frame data is needed, processing proceeds to 611 to load additional reference frame data. For example, the next search region includes data not loaded in the line buffer and new reference data must be retrieved to prepare the next search region. In the event no additional reference frame data is needed, processing loops back to 603 to prepare a new search region from the line buffer.

At 611, the reference frame line buffer is incrementally loaded with additional reference frame data. For example, additional rows of the reference frame are loaded into the reference frame line buffer. The additional rows replace rows that are no longer needed. For example, a reference frame row that is fully searched and/or the corresponding pixels that are no longer needed for the source block search are replaced with a new reference frame row. In various embodiments, only once a row is no longer needed is it replaced with a new row. As described with respect to step 601, incremental loads will load each new row of the reference frame in its entirety.

At 613, candidate motion vectors for a source frame block are identified. For example, the best candidate motion vectors are identified by comparing the motion estimates computed at 605. In some embodiments, the number of candidate motion vectors is configurable. For example, one, two, or more best candidate motion vectors can be identified. In some embodiments, the step of 613 is performed at and as described with respect to step 509 of FIG. 5.

Figure 7:
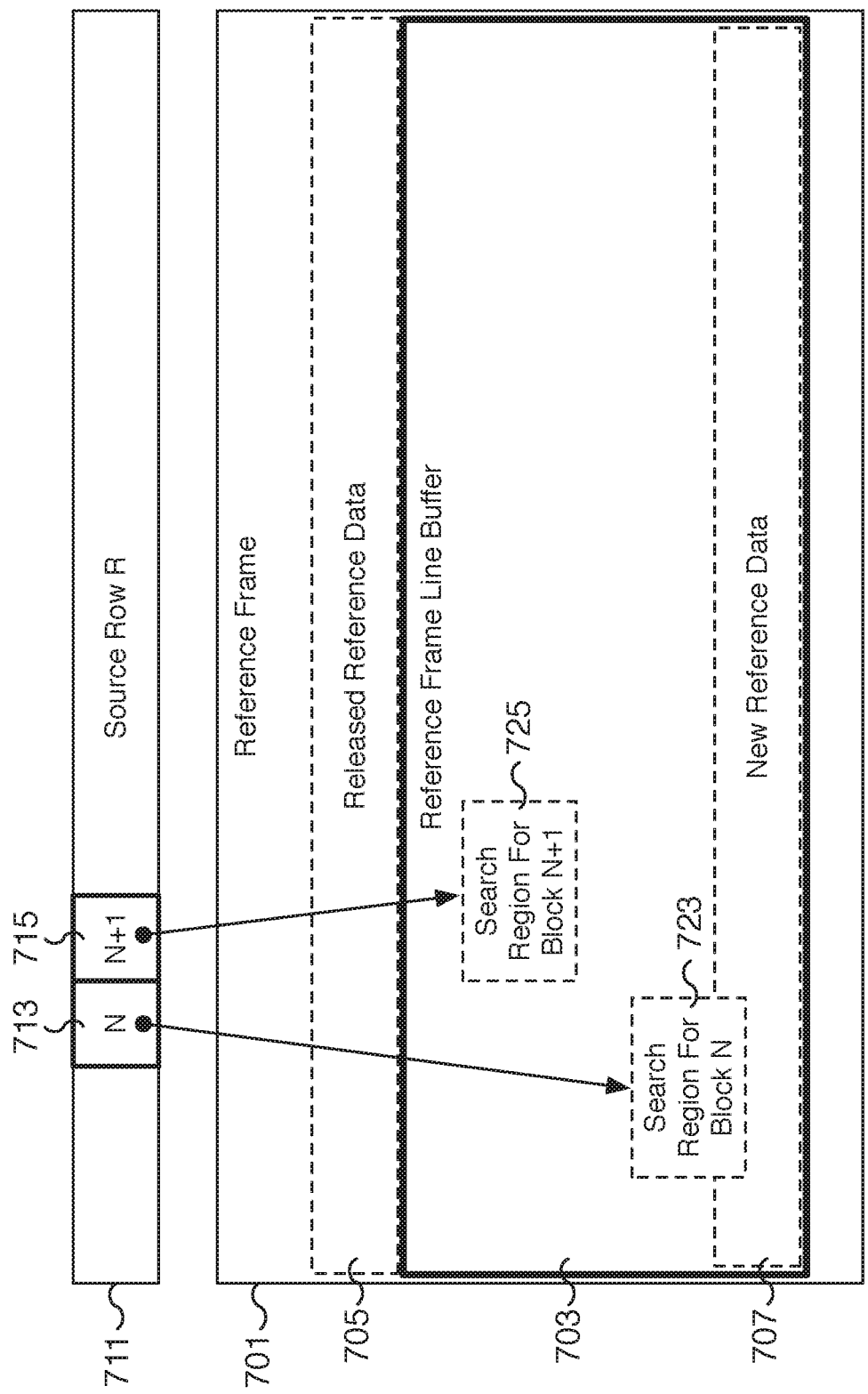
FIG. 7 is a diagram illustrating an embodiment of a reference frame line buffer and corresponding source row for performing a motion estimation search.

FIG. 7 is a diagram illustrating an embodiment of a reference frame line buffer and corresponding source row for performing a motion estimation search. In the example shown, reference frame line buffer 703 is overlaid on reference frame 701 to depict how reference data is loaded into reference frame line buffer 703 for performing a motion estimation search with corresponding source row 711. Source row 711 is one of many source rows of a source frame. Source row 711 includes multiple source frame blocks such as source frame block 713 and 715, as examples. In some embodiments, each source frame block, including source frame blocks 713 and 715, is a 16×16 pixel block. Reference data loaded from reference frame 701 into reference frame line buffer 703 includes new reference data 707 and search regions 723 and 725. Search region 723 represents a search region for source frame block 713 and search region 725 represents a search region for source frame block 715. Released reference data 705 corresponds to a row of reference frame 701 that is no longer stored in reference frame line buffer 703. In some embodiments, as the current source row advances down the source frame, portions of reference frame 701 are released from reference frame line buffer 703 and new reference data is loaded into reference frame line buffer 703 corresponding to the new row search region of a new source row. In the example shown, the new rows of reference data are new reference data 707 and the released reference data is released reference data 705. In various embodiments, new reference data 707 is loaded as complete or entire rows of reference frame 701. In some embodiments, released reference data 705 and new reference data 707 are each 16 pixels tall corresponding to the height of a 16×16 pixel source block of source row 711.

In some embodiments, the motion estimation search for a source frame is performed from top to bottom and from left to right in raster order using increments of source frame blocks, such as 16×16 pixel blocks. For each source row and the corresponding source frame blocks of the row, a potential search region exists. For each new source row being searched, the corresponding search region for the row is loaded into reference frame line buffer 703. When the search using the source row is complete, the top portion of the corresponding reference data can be released and is no longer needed for the next source row. The potential search region for the next source row includes an incremental portion of reference data that is new reference data 707. At the start of a new source row, new reference data 707 is loaded into reference frame line buffer 703 as complete or entire rows of reference frame 701. In some embodiments, new reference data 707 is a row of reference data from reference frame 701 with the same height as source row 711 and source row blocks, such as source row blocks 713 and 715. In some embodiments, the processes of FIG. 3-6 utilize reference frame line buffer 703 of FIG. 7 for performing efficient motion estimation searches. For example, the source frame block and a corresponding reference frame of FIG. 5 is a source frame block of source row 711 and reference frame 701, respectively. In some embodiments, search regions 723 and 725 are search regions of FIGS. 5 and/or 6. In some embodiments, reference frame line buffer 703 is reference frame line buffer 205 of FIG. 2.

In some embodiments, new reference data 707 corresponds to one or more rows of reference frame 701 that are incrementally loaded to complete the row search region for a new source row. By incrementally loading entire (or complete) rows, the reference frame data is efficiently loaded and there is no requirement to load the same data multiple times. In some embodiments, the new rows are loaded at 611 of FIG. 6. Although new reference data 707 is depicted below released reference data 705 in FIG. 7, the actual location of new reference data 707 can vary as reference frame line buffer 703 cycles through reference frame 701. For example, in some embodiments, reference frame line buffer 703 operates as the circular buffer. Once the end of reference frame line buffer 703 is reached, new reference data 707 is written to the start of reference frame line buffer 703. Although reference frame 701 may be searched from top to bottom, the rows of the reference frame data stored in reference frame line buffer 703 may not be stored in corresponding top to bottom order. For example, the corresponding reference data stored in reference line buffer 703 may wrap around the end of reference line buffer 703 to the start of reference frame line buffer 703. Depending on the available memory size of reference frame line buffer 703, in some embodiments, new reference data 707 replaces released reference data 705. In some embodiments, the memory of reference frame line buffer 703 is larger than a row search region and reference frame line buffer 703 has additional available memory between new reference data 707 and released reference data 705.

In some embodiments, reference frame line buffer 703 is configurable. For example, the row length and/or reference frame size may be used to configure reference frame line buffer 703 to support different frame sizes and search regions. For smaller resolution frames, the row length will be shorter. In some embodiments, more rows of a lower resolution reference frame can be loaded into reference frame line buffer 703 than rows of a higher resolution reference frame. Although reference frame line buffer 703 is shown as a rectangular memory layout that matches the proportions of a reference frame, the actual layout of the reference frame data in reference frame line buffer 703 may differ. For example, multiple rows of a low resolution frame may be loaded in the same row to increase the utilization of the line buffer. In some embodiments, a local memory buffer is used to help realign the reference data for preparing search regions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
 a source block buffer configured to store at least a portion of a source block of a source frame of a video; and
 a plurality of hardware motion estimation search processing units in communication with the source block buffer and configured to perform at least a portion of a motion estimation for the source block at least in part in parallel across a plurality of different reference frames of the video, wherein each processing unit of the hardware motion estimation search processing units is configured to be assigned a different one of the plurality of different reference frames and is configured to compare at least the portion of the source block with a portion of the assigned one of the different reference frames;
 wherein the source block buffer is configured to receive at least the portion of the source block from memory, the plurality of hardware motion estimation search processing units are configured to receive at least the portion of the source block from the same source frame for processing in parallel but each of the plurality of hardware motion estimation search processing units are configured to independently receive from the memory via data paths excluding the source block buffer the corresponding different one of the plurality of different reference frames, and the same source block buffer is connected to each of the plurality of hardware motion estimation search processing units via different independent connections, and the motion estimation of the hardware motion estimation search processing units includes a hierarchical motion search, an integer motion search, and a sub-pixel motion search.

2. The system of claim 1, wherein at least one of the processing units includes a reference frame line buffer configured to store at least some of the portion of the assigned one of the different reference frames being compared.

3. The system of claim 1, wherein at least one of the processing units includes a reference frame line buffer configured to store at least a complete row of pixels of the assigned one of the different reference frames.

4. The system of claim 1, wherein the source frame of the video is a down-sampled version of an original video.

5. The system of claim 4, wherein the down-sampled version of the original video was down-sampled by a factor of 16 or by a factor of 4.

6. The system of claim 1, wherein the source block is a 16×16 pixel block of the source frame of the video.

7. The system of claim 1, wherein the plurality of hardware motion estimation search processing units includes at least three hardware motion estimation search processing units and each of the plurality of hardware motion estimation search processing units includes a respective reference frame line buffer configured to store complete rows of pixels of the assigned one of the different reference frames.

8. The system of claim 7, wherein each of the plurality of hardware motion estimation search processing units includes a respective local buffer configured to align at least a subset of a plurality of rows of reference data stored in the corresponding reference frame line buffer.

9. The system of claim 1, wherein each of the plurality of estimation search processing units includes a respective motion buffer configured to store intermediate motion search results.

10. The system of claim 1, wherein each of the hardware motion estimation search processing units is further configured to be assigned and sequentially perform a second portion of a motion estimation for the source block on a second different one of the plurality of different reference frames of the video.

11. A system for performing hierarchical motion search processing, comprising:
 a source block buffer configured to store a source block of a source frame of a video; and
 three or more hardware motion estimation search processing units in communication with the source block buffer and each configured to at least in part concurrently:
 receive a portion of a different reference frame of the video, wherein the portion of the different reference frame is stored in a reference frame line buffer;
 perform a motion estimation for the source block using a plurality of search regions of the portion of the received different reference frame; and identify a plurality of motion vectors corresponding to one or more portions of the different reference frame based on the motion estimation performed;

wherein the source block buffer is configured to receive at least the portion of the source block from memory, the three or more hardware motion estimation search processing units are configured to receive at least the portion of the source block from the same source frame for processing in parallel but each of the three or more hardware motion estimation search processing units are configured to independently receive from the memory via data paths excluding the source block buffer the corresponding different reference frame of the video, and the same source block buffer is connected to each of the plurality of hardware motion estimation search processing units via different independent connections, and the motion estimation of the hardware motion estimation search processing units includes a hierarchical motion search, an integer motion search, and a sub-pixel motion search.

12. The system of claim 11, wherein the three or more hardware motion estimation search processing units are each further configured to store intermediate motion search results in a respective motion buffer.

13. The system of claim 11, wherein the source frame of the video is a down-sampled version of an original video.

14. The system of claim 13, wherein the down-sampled version of the original video was down-sampled by a factor of 16 or by a factor of 4.

15. The system of claim 11, wherein the source block is a 16×16 pixel block of the source frame of the video.

16. A method, comprising:
providing from a source block buffer one or more source blocks of source frames of a down-sampled version of an original video to a plurality of hardware motion estimation search processing units;
providing a different reference frame of a plurality of reference frames of the down-sampled version of the original video to each of the plurality of hardware motion estimation search processing units;
performing a motion estimation for each of the provided one or more source blocks using the plurality of hardware motion estimation search processing units; and
identifying a plurality of motion vectors corresponding to portions of the provided plurality of reference frames based on the motion estimation performed;
wherein the source block buffer is configured to receive the one or more source blocks from memory, the plurality of hardware motion estimation search processing units are configured to receive at least a portion of the one or more source blocks from the same source frame for processing in parallel but each of the plurality of hardware motion estimation search processing units are configured to independently receive from the memory via data paths excluding the source block buffer the corresponding different reference frame, and the same source block buffer is connected to each of the plurality of hardware motion estimation search processing units via different independent connections, and the motion estimation of the hardware motion estimation search processing units includes a hierarchical motion search, an integer motion search, and a sub-pixel motion search.

17. The method of claim 16, wherein the provided different reference frame is stored as reference data in a reference frame line buffer of a corresponding one of the plurality of hardware motion estimation search processing units.

18. The method of claim 17, wherein the stored reference data corresponds to complete rows of pixels of the provided different reference frame.

19. The method of claim 16, wherein each of the plurality of hardware motion estimation search processing units includes a respective motion buffer configured to store intermediate motion search results.

20. The method of claim 16, wherein each pixel of the down-sampled version of the original video is determined by evaluating a plurality of neighboring pixels of the original video.

* * * * *